United States Patent [19]

Matz

[11] Patent Number: 5,092,491
[45] Date of Patent: Mar. 3, 1992

[54] METERING APPARATUS FOR LUMP AND POWDER MATERIALS

[75] Inventor: Ludwig Matz, Tornesch, Fed. Rep. of Germany

[73] Assignee: Nordmark Arzneimittel GmbH, Uetersen, Fed. Rep. of Germany

[21] Appl. No.: 571,282

[22] Filed: Aug. 23, 1990

[30] Foreign Application Priority Data

Sep. 6, 1989 [DE] Fed. Rep. of Germany ....... 3929588

[51] Int. Cl.⁵ ............................................. G01F 11/00
[52] U.S. Cl. ..................................... 222/135; 73/429; 141/27; 141/108; 222/158; 222/192; 222/386; 294/55
[58] Field of Search ............... 222/191, 192, 135, 136, 222/137, 158, 323, 324, 356–358, 386, 369; 294/55; 215/365; 30/324, 123, 123.3, 125; 604/57–59; 73/426, 427, 429; 426/115; 141/108, 109, 27; D10/46.2

[56] References Cited

U.S. PATENT DOCUMENTS

| 185,961 | 1/1877 | Pratt | 294/55 X |
| 869,879 | 11/1907 | Cameron | 222/386 X |
| 874,277 | 12/1907 | Adams et al. | 222/386 X |
| 1,188,980 | 6/1916 | Murrell | 73/429 |
| 2,175,747 | 10/1939 | Dodd | 222/323 X |
| 2,698,996 | 1/1955 | Hickerson | 30/324 X |
| 2,747,410 | 5/1956 | Dubin | 73/429 |
| 2,752,920 | 7/1956 | Kurkjian | 222/386 X |
| 3,166,221 | 1/1965 | Nielsen | 222/386 X |

FOREIGN PATENT DOCUMENTS

| 92686 | 5/1923 | Austria | 30/324 |
| 69694 | 7/1893 | Fed. Rep. of Germany | 294/55 |
| 352484 | 4/1961 | Switzerland | 222/386 |
| 1017425 | 1/1966 | United Kingdom | 222/192 |

Primary Examiner—Kevin P. Shaver
Attorney, Agent, or Firm—Keil & Weinkauf

[57] ABSTRACT

An apparatus for removing powder or lump materials from a storage vessel, obtaining a preselected volume of the material, returning any excess material to the storage vessel, and dispensing the obtained measured material. The apparatus contains a product-receiving part, a handle portion, and a transition area in the shape of a taper which tapers downwardly toward the handle, which transition area connects the product-receiving part with the handle. The handle comprises a tube which is closed by a movable piston. The tube may be marked to facilitate measuring the volume of the material.

8 Claims, 3 Drawing Sheets

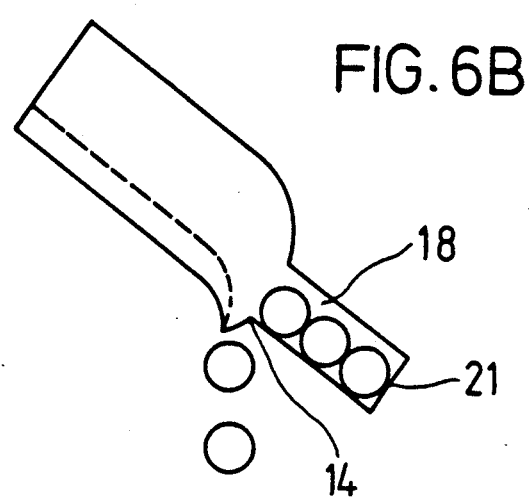
FIG. 6B
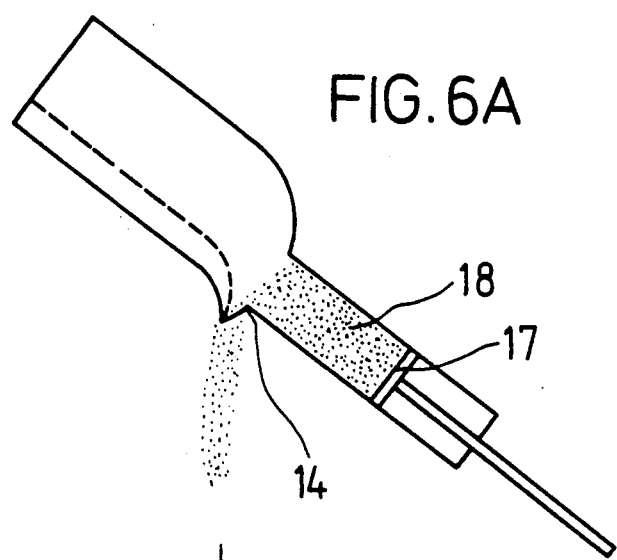
FIG. 6A
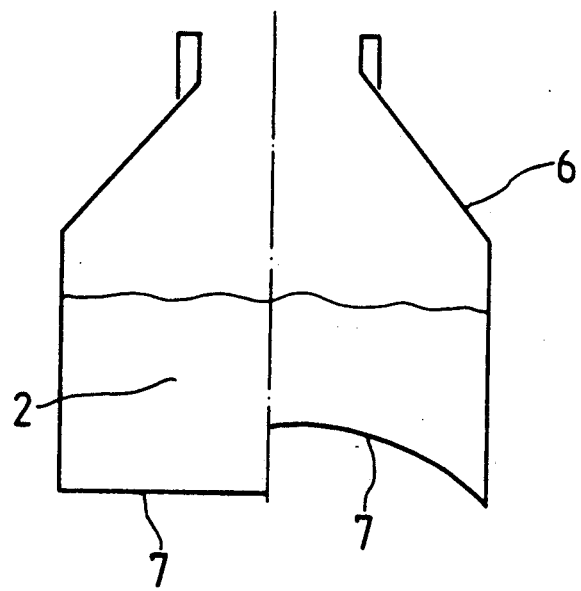

METERING APPARATUS FOR LUMP AND POWDER MATERIALS

BACKGROUND OF THE INVENTION the present invention relates to an apparatus for removing and metering portions of lump or powder materials from storage containers by means of a product receiving part fastened to a shaft/handle. Apparatuses of the type stated at the outset are known in the form of a wide variety of metering spoons. They are used for metering liquids and powders.

The disadvantage of all these designs is that they cannot be used for accurate metering of variable and, frequently, also constant amounts/volumes.

The metering of uniform coarse products is also difficult. This problem can often only be solved by subsequent counting unless an expensive metering apparatus having a counting means is available.

Another disadvantage is that lump and powder materials cannot be completely removed from storage containers using the conventional metering spoons. Storage containers must be tilted in order to pour the materials onto the metering spoon; in the case of large bottle mouths, this is difficult and frequently leads to spillage of materials.

SUMMARY OF THE INVENTION

It is an object of the present invention to provide an apparatus for removing and metering lump and/or powder materials from storage containers, by means of which
1. lump and/or powder materials can be removed from storage containers and metered in a variable manner in a predetermined volume or amount,
2. the storage container can be completely emptied,
3. lump and/or powder materials can be metered and
4. high accuracy and reproducibility of metering can be achieved in a simple manner and reliably.

We have found that this object is achieved, according to the invention, if the product receiving part is connected directly to a tube which is closed by a movable piston and acts as a shaft/handle.

This apparatus permits lump and/or powder materials (2) to be removed from a storage container (6) and variably metered in the desired volumes or amounts corresponding to requirements.

The amount 18 or volume 18 to be metered is set with the aid of the marks 20 present on the shaft/handle 16 and with the aid of the movable piston 17, before removal from the storage vessel 6. The amounts 18 metered using the metering apparatus or the metered volumes 18 have substantially improved constancy and accuracy compared with conventional metering spoons, this also being true with regard to the measurement of liquids.

The invention is illustrated below with reference to FIGS. 1 to 6.

BRIEF DESCRIPTION OF THE DRAWING

FIG. 6a shows a longitudinal section through the filled metering apparatus 1 with preset metering volume/metering amount 18 during return of the excess lump or powder materials 2 into the storage container 6 and FIG. 6b shows a longitudinal section through the filled metering apparatus 1 with a predetermined metering volume/metering amount 18 during return of the excess lump materials 2 into the storage container 6.

DESCRIPTION OF THE INVENTION

Figure 1:
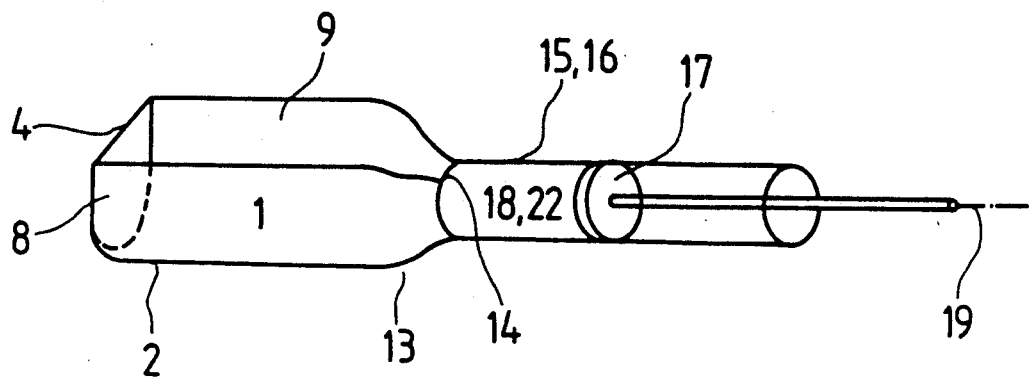
FIG. 1 shows a view of metering apparatus 1.
Figure 2A:
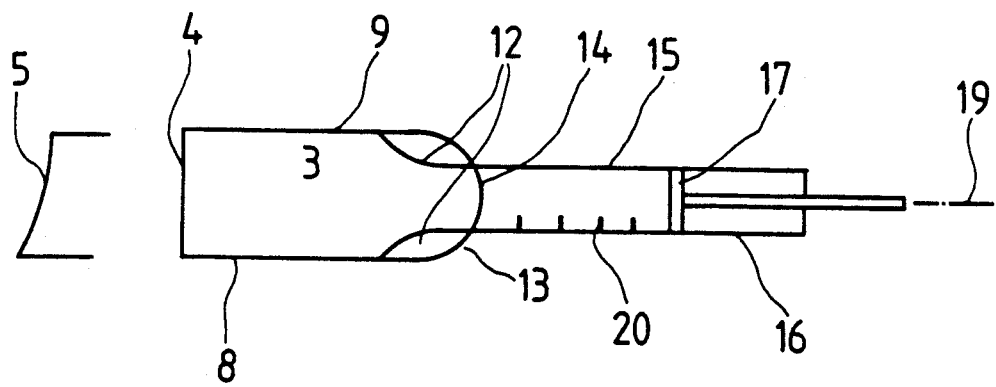
FIG. 2a shows a plan view of metering apparatus 1 with preset metering volume/metering amount 18.
Figure 2B:
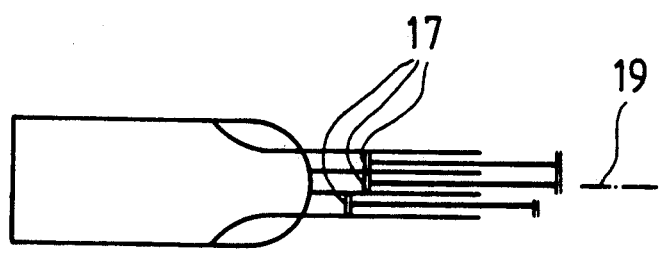
FIG. 2b shows a plan view of metering apparatus 1 having a shaft/handle 16 and a plurality of tubes 15 and with preset metering volume/metering amount 18.
Figure 3A:
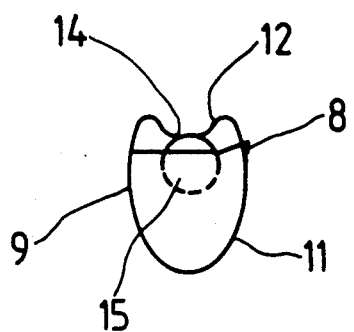
FIG. 3a shows a cross-section through metering apparatus 1 having a bottom of elliptical cross-section 11.
Figure 3B:
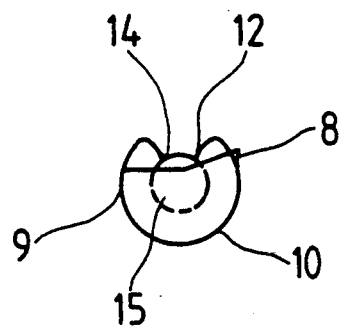
FIG. 3b shows a cross-section through metering apparatus 1 having a bottom of circular cross-section 10.
Figure 4:
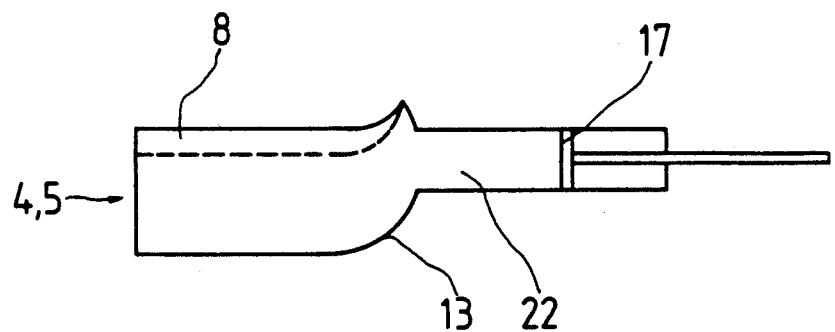
FIG. 4 shows a longitudinal section through metering apparatus 1 with preset meterings volume/metering amount 18.
Figure 5A:
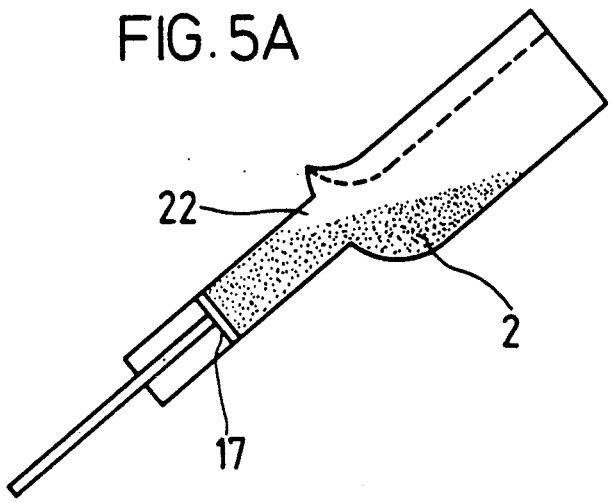
FIG. 5a shows a longitudinal section through the filled metering apparatus 1 with preset metering volume/metering amount 18 during filling of the free tube volume 22 from the product receiving part 3.
Figure 5B:
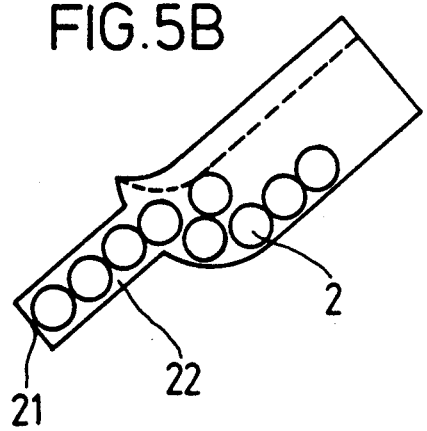
FIG. 5b shows a longitudinal section through the filled metering apparatus 1 with a predetermined metering volume/metering amount 18 during filling of the free tube volume 22 from the product receiving part 3.

A metering apparatus 1 contains lump or powder materials 2.

The product receiving part 3 is defined by a flat first end face 4 or a first end face 5 which is adapted to the storage container base 7 and is helpful for complete emptying of storage vessels 6, a side wall 8 having tangential ends, the opposite side wall 9, the bottom which connects them and has a circular 10 or elliptical 11 cross-section and the second end face 13 which joins a taper 12.

An orifice in the second end face 13 either directly joins the tube 15 or is used to connect a tube 15 to the product receiving part 3 by welding, linking or screwing.

The edge 14 at the end of the taper 12 is the beginning of the transition from product receiving part 3 to the shaft/handle 16 in the form of tube 15. The tube 15 contains a closure in the form of movable piston 17.

At the same time, this edge 14 is the fixed upper limit of the metering volume/metering amount 18 which can be set by means of the movable piston 17 in tube 15.

The product receiving part 3 of metering apparatus 1 is filled in a storage vessel 6 with lump or powder materials 2, the tangential side wall 8 assisting with complete filling, in particular when there is a small residual amount in storage vessel 6. The metering apparatus 1 is then removed from the storage vessel 6.

The free tube volume 22 is then filled with lump or powder materials 2 from product receiving part 3 by swiveling the metering apparatus 1 into an inclined position corresponding to the slope of the lump or powder materials 2.

A measured metering volume/metering amount 18 is obtained by rotating the metering apparatus 1 into an inclined position around the tube axis 19. Excess lump or powder materials 2 removed from storage vessel 6 fall through the taper 12 of product receiving part 3 into a vessel, for example back into storage vessel 6. The measured metering volume/metering amount 18 is returned to the product receiving part 3 by tilting and can be removed from here by any method.

Regularly shaped lump materials 2 can be metered in an accurate number of lumps by means of the embodiment of metering apparatus 1 whose shaft/handle 16 consists of a plurality of tubes 15. For this purpose, the pistons 17, which can be moved individually or together, are set to the desired metering amount 18 and the procedure described is followed.

We claim:

1. An apparatus for removing portions of lump or powdered materials from a storage vessel, obtaining a measured volume of the lump or powdered material, returning excess lump or powdered material to the storage vessel, and dispensing the measured volume of the lump or powdered material, which apparatus comprises a product-receiving part, a handle which comprises at least one tube, which tube contains a movable piston which closes the tube, and wherein there is a transition area between the product-receiving part and the tube, which transition area is in the form of a taper, the greater end of which taper is toward the product-receiving part and the lesser end of which taper is toward the handle.

2. The apparatus of claim 1, wherein the product-receiving part has a bottom with a circular cross-section, the radius of which is greater than the radius of the tube.

3. The apparatus of claim 2, wherein the transition area contains a round orifice joining the transition area and the tube, and wherein the circumference of the orifice is less than or equal to half the circumference of a circle formed by extending the bottom of the product-receiving part.

4. The apparatus of claim 1, wherein the product-receiving part has a side wall, which has tangential ends.

5. The apparatus of claim 1, wherein the taper-shaped transition area between the product-receiving part and the tube contains walls which do not completely enclose the transition area.

6. The apparatus of claim 1, wherein the tube is transparent and contains visible marks for use in measuring the volume of the lump or powdered material.

7. The apparatus of claim 1, wherein a plurality of the apparatus as defined in claim 1 are arranged side by side, and wherein each apparatus is independently operable.

8. The apparatus of claim 1, wherein the handle comprises a plurality of tubes and each tube contains a movable piston which closes the tube.

* * * * *